United States Patent Office 3,272,874

Patented Sept. 13, 1966

1

2

3,272,874
PRODUCTION OF NITROALKANES

Richard L. Abbott, Terre Haute, Ind., assignor to Commercial Solvents Corporation, New York, N.Y., a corporation of Maryland No Drawing. Filed Nov. 18, 1964, Ser. No. 412,244
3 Claims. (Cl. 260—644)

This invention relates to the production of nitroalkanes. In a particular aspect, it pertains to a process for the production of nitroalkanes by the vapor phase nitration of alkanes at elevated temperatures and pressures by the use of nitric acid or oxides of nitrogen, in the presence of oxygenated sulfur compounds.

Nitroalkanes were first prepared by Victor Meyer in 1872 by reacting an alkyl halide with silver nitrite and in 1880 the nitration of saturated aliphatic hydrocarbons in the liquid phase was reported by Beilstein and Kurbatov. Although liquid phase nitration was the subject of several succeeding studies, the process gave low yields and was never used on a commercial scale. In general the liquid phase process was basically the one being used successfully for nitration of aromatic hydrocarbons where mixed nitric and sulfuric acids were used to effect the nitration and the same acid mixture and the same general techniques were employed for the nitration of alkanes.

The liquid phase process was further investigated by Senkus, U.S. Patent 2,332,491, who discovered that a material which would reduce nitric acid—particularly sulfur, carbon, and other nitrated alkanes—catalyzed the reaction. His process was limited to hydrocarbons which were in the liquid phase at the temperature of reaction, 125 to 150° C., and therefore the more volatile hydrocarbons such as ethane, propane, and butane were unsuitable for use.

One difficulty with liquid phase nitration of alkanes was the immiscibility of nitric acid and the alkane. Hass, Hodge and Vanderbilt, U.S. Patent 1,967,667 conducted the nitration reaction in the vapor phase and thereby avoided the solubility problem inherent with liquid phase nitration. The lower members of the alkane series, namely $C_3$ to $C_8$ hydrocarbons, were the preferred materials because of their high volatility and availability in large quantities at a low price.

In the Hass et al. process, temperatures of from about 135 to 300° C. and pressures of from about 600 to 2400 pounds per square inch were employed. This process gave good yields of nitroalkanes (as measured by the percentage of hydrocarbon converted to nitroalkane) and conversions (as measured by the percentage of nitric acid converted to nitroalkane). These inventors stated that it was inadvisable to employ sulfuric acid to aid the reaction. Apparently they did not observe in their process the effect of sulfuric acid on product distribution ratio. This effect of sulfuric acid forms a part of this invention and will be described in greater detail hereinafter.

Hass and Hodge later (U.S. Patent 2,071,122) extended their process for the nitration of ethane by either nitric acid or nitrogen dioxide using temperatures of 300–500° C. at atmospheric pressures.

Nygaard and Denton, in U.S. Patent 2,489,320, disclosed a process for producing 2,2-dinitropropane and 2-nitropropane by the nitration of propane at temperatures of about 150° C. to about 250° C. at an elevated pressure. Although they preferred nitric acid to effect the nitration, they also successfully used a mixture of nitric and sulfuric acids. No nitromethane was found in their product and only traces of nitroethane and 1-nitropropane were found.

The production of nitroalkanes has been the subject of many improvements, but one unresolved problem in the process for nitrating $C_2$ and higher alkanes is the inability to control the chemical reactions to produce the nitroalkanes in a product distribution ratio keyed to economic conditions. For example, the nitration of propane by the process described in U.S. Patents Nos. 1,967,667 and 2,071,122 produces not only 2-nitropropane, but also 1-nitropropropane, nitroethane and nitromethane. These nitroalkanes are produced in a certain ratio depending upon the nitrating conditions and it heretofore has not been possible to readily change this ratio. This inability to control this product distribution has been a problem because these nitroalkanes are useful in different ways, so to satisfy the market demand for one, it is sometimes necessary to produce and store surplus quantities of the others.

The process of the present invention helps alleviate this general problem by influencing the chemical reaction to provide a product distribution ratio different from that heretofore obtained. Furthermore, this new process can be alternated at will with one of the prior processes to produce nitrated alkanes in the distribution ratio most suitable at the time.

It is an object of this invention to provide a process for producing nitroalkanes by the vapor phase nitration of alkanes.

Another object of this invention is to provide a method of effecting the nitration of $C_2$ and higher alkanes in the vapor phase by the use of a nitrating agent in the presence of an oxygenated sulfur compound.

Other objects of this invention will become apparent to those skilled in the art from the description of this invention.

It has been discovered that, in the process for the production of nitroalkanes by the vapor phase nitration of $C_2$ or higher alkanes, effecting the nitration in the presence of an oxygenated sulfur compound results in a change in the product distribution ratio. As a specific example, it has been discovered that when propane is reacted in the vapor phase wih nitric acid, the presence of an oxygenated sulfur compound results in increased production of nitromethane and 2-nitropropane and decreased production of nitroethane and 1-nitropropane.

Any of the prior procedures for the vapor phase nitration of alkanes may be employed using the oxygenated sulfur compounds of this invention. Reaction temperatures, nitric acid concentrations, ratios of reactants and other nitrating conditions previously found satisfactory will also be found satisfactory with the oxygenated sulfur compounds. In the improved process of the present invention the vapor-phase nitration of alkanes is preferably conducted at temperatures of from about 200° C. to about 500° C. and at pressures of from about atmospheric to about 500 p.s.i.g.

The alkanes which can be used in this process include straight-chain, branched-chain, and cyclic saturated aliphatic hydrocarbons which contain at least 2 carbon atoms in the molecule and which are in the vapor phase under the conditions of the reaction. For example, alkanes which can be used include ethane, propane, n-butane, isobutane, the pentanes, the hexanes, including cyclohexane, the heptanes and the octanes. Pure or commercial grade hydrocarbons are satisfactory for use in this process.

The nitrating agents used to accomplish the nitration can be nitric acid, nitrogen dioxide, nitrogen tetroxide and mixtures thereof. The nitric acid can be as dilute as about 19–20% in water or it can be substantially anhydrous. In general, acid strength of from about 65% to about 70% is preferred.

The oxygenated sulfur compounds employed in this invention include sulfur dioxide, sulfur trioxide, sulfuric acid, and mixtures thereof. Pure or commercial grades of these oxygenated sulfur compounds may be used. Fuming sulfuric acid, concentrated sulfuric acid or dilute sulfuric acid may be used. In general, the oxygenated sulfur compound is used in a small amount effective to change the distribution ratio of the products.

For each mole of nitrating agent used, from about 6 to about 35 moles of hydrocarbon is preferably used and from about 0.01 to 1 mole of oxygenated sulfur compound is preferably used, and more preferably about 0.03 to about 0.2 mole of oxygenated sulfur compound is used. Smaller quantities than 0.01 mole of oxygenated sulfur compound per mole of nitric acid can also be used, but diminished effects on the distribution ratio of nitroparaffins may result. In general, amounts of oxygenated sulfur compound above 1 mole per mole of nitric acid may adversely affect the nitration reaction. By carrying out the nitration of propane, for example, with amounts of materials as stated above, the amount of nitromethane and 2-nitropropane produced is maximized, and the amount of nitroethane and 1-nitropropane is minimized.

The method of employing oxygenated sulfur compounds in the nitration process can be varied without departing from the concept of this invention. In the nitration process, the alkane and the nitrating agent are reacted in the vapor phase in the reaction zone as is known in the art. Several methods of introducing the reactants are known and any of these methods can be employed in the practice of this invention.

In a preferred embodiment of this invention, the alkane and the nitrating agent are conducted from their respective sources to a common duct leading to the reaction zone. It is advantageous to preheat the reactants in the common duct in a preheating zone prior to introducing them into the reaction zone. If either of the reactants is in the liquid phase when introduced into the common duct, it is vaporized in the preheating zone.

The oxygenated sulfur compound can be introduced into the reaction zone by any convenient method. It can be introduced into the common duct of the preferred embodiment either separately or mixed with the nitrating agent. Alternatively it can be introduced directly into the reaction zone through an orifice located adjacent to the entry of the reactant stream entering the reaction zone from the preheating zone. When the hydrocarbon and the nitrating agent are separately introduced into the reaction zone, the oxygenated sulfur compound is preferably introduced adjacent to the entering hydrocarbon stream.

When the oxygenated sulfur compound is sulfur dioxide it is preferred to introduce vapors from a sulfur dioxide source into a duct common with the alkane. When the oxygenated sulfur compound is sulfur trioxide or sulfuric acid, and the nitrating agent is nitric acid, it is preferred to mix the oxygenated sulfur compound with the nitric acid prior to introduction to the reaction zone.

Other methods of introducing the oxygenated sulfur compound into the reaction zone will be obvious to those skilled in the art. Any method of providing oxygenated sulfur compound in the reaction zone will be satisfactory for the practice of this invention.

The following specific examples illustrate the operation of this process. It is understood, however, that the process is not limited either to the specific operating conditions or to the specific amounts of reactants shown therein.

*Example I*

*Run A.*—Commercial grade propane vapor, 3.24 moles, was passed into a common duct leading through a preheating zone to a reaction zone at a rate of about 2.5 to about 3 liters/min. Simultaneously and proportionately, nitric acid, 0.54 mole as 69% by weight aqueous solution, was pumped into the common duct at a rate of about 1 to 1.5 ml./min. The mixture of reactants was heated in the preheating zone to about 250° C., and then was passed into the reaction zone maintained at a temperature of 425° C. The products of reaction and the unreacted raw materials were conducted out of the reaction zone to a cooling zone where crude nitroalkanes, unreacted nitric acid and some of the by-products were collected. The nitroalkanes produced had the following distribution ratio:

| | Percent by weight |
|---|---|
| Nitromethane | 13 |
| Nitroethane | 15 |
| 2-nitropropane | 36 |
| 1-nitropropane | 36 |

*Run B.*—Run B was conducted in a manner similar to Run A using 2.82 moles of propane and 0.47 mole of 69% by weight aqueous nitric acid; in addition, 0.029 mole of commercial sulfur dioxide (0.062 mole of sulfur dioxide per one mole of nitric acid) was added to the mixture of reactants in the common duct ahead of the preheating zone. In this run the nitroalkanes produced had the following distribution ratio:

| | Percent by weight |
|---|---|
| Nitromethane | 16.5 |
| Nitroethane | 13.8 |
| 2-nitropropane | 38.4 |
| 1-nitropropane | 31.3 |

Thus the oxygenated sulfur compound affected the nitration reaction to favor the production of nitromethane and 2-nitropropane.

*Example II*

*Run C.*—Using the same apparatus and conditions as used for Example I, 2.82 moles of propane, 0.47 mole of 69% by weight aqueous nitric acid and 0.07 mole of sulfur dioxide (0.15 mole of sulfur dioxide per one mole of nitric acid) was introduced into the duct ahead of the preheating zone. The distribution ratio was as follows:

| | Percent by weight |
|---|---|
| Nitromethane | 14.9 |
| Nitroethane | 13.7 |
| 2-nitropropane | 40.1 |
| 1-nitropropane | 31.3 |

In this run, the production of 2-nitropropane was even greater than in Run B of Example 1.

*Example III*

*Run D.*—Run B of Example I was repeated except that the sulfur dioxide and nitric acid were replaced with an acid mixture consisting of about one part of concentrated sulfuric acid (95% grade) dissolved in nine parts of 69% aqueous nitric acid. This is equivalent to about 0.1 mole of sulfuric acid per mole of nitric acid. The amount of acid mixture introduced into the duct was chosen to provide about 0.47 mole of nitric acid as in Runs B and C.

The nitroalkane produced had the following distribution ratio:

| | Percent by weight |
|---|---|
| Nitromethane | 14.2 |
| Nitroethane | 10.7 |
| 2-nitropropane | 47.1 |
| 1-nitropropane | 28.0 |

The effect of sulfuric acid on the reaction to promote the production of 2-nitropropane is particularly noteworthy in this example.

*Example IV*

Run E.—Using the same apparatus and conditions as used for Example I, 3.0 moles of butane, 0.50 mole of 70% by weight aqueous nitric acid and 0.10 mole of sulfur trioxide are introduced into the duct ahead of the preheating zone. The presence of the sulfur trioxide produces a substantial effect on the product distribution ratio.

Having disclosed this invention, what is claimed is:

1. In a process for the production of substantial amounts of nitromethane, nitroethane, 1-nitropropane and 2-nitropropane by the vapor phase nitration of propane at predetermined elevated temperatures and pressures, with a nitrating agent selected from the group consisting of nitric acid, nitrogen dioxide and mixtures thereof, the improvement which comprises effecting said nitration in the presence of sulfur dioxide, thereby producing enhanced amounts of nitromethane and 2-nitropropane while still producing lesser but substantial amounts of nitroethane and 1-nitropropane as compared with a process conducted in the absence of an oxygenated sulfur compound.

2. The improvement of claim 1 wherein the sulfur dioxide is used in an amount of from about 0.01 to about 1.0 mole per mole of nitrating agent.

3. In a process for the production of substantial amounts of nitromethane, nitroethane, 1-nitropropane and 2-nitropropane by the vapor phase nitration of propane at predetermined elevated temperatures and pressures, with a nitrating agent selected from the group consisting of nitric acid, nitrogen dioxide and mixtures thereof, the improvement which comprises effecting said nitration at a temperature of from about 250° C. to about 425° C. in the presence of from about 0.03 to about 0.2 mole of sulfur dioxide, thereof thereby producing enhanced amounts of nitromethane and 2-nitropropane while still producing lesser but substantial amounts of nitroethane and 1-nitropropane as compared with a process conducted in the absence of an oxygenated sulfur compound.

References Cited by the Examiner

UNITED STATES PATENTS 2,489,320  10/1949  Nygaard et al. _____ 260—644

BENJAMIN R. PADGETT, *Primary Examiner.*

CARL D. QUARFORTH, LEON D. ROSDOL,
*Examiners.*

L. A. SEBASTIAN, *Assistant Examiner.*